United States Patent
Bulat

(10) Patent No.: US 6,422,096 B1
(45) Date of Patent: *Jul. 23, 2002

(54) LOAD CELL

(75) Inventor: Bülent Bulat, Framingham, MA (US)

(73) Assignee: BLH Electronics, Inc., Canton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,157

(22) Filed: Aug. 6, 1998

(51) Int. Cl.[7] .............................. G01L 1/00; G01L 5/00
(52) U.S. Cl. .............................. 73/862.381; 73/862.68; 73/862.44; 73/862; 73/862.634
(58) Field of Search ..................... 73/862.042, 862.043, 73/862.44, 862.045, 862.046, 862.68, 862.381; 177/136

(56) References Cited

U.S. PATENT DOCUMENTS

| 3,602,866 | A |   | 8/1971  | Saxl |  |
|-----------|---|---|---------|------|--|
| 3,771,359 | A |   | 11/1973 | Shoberg |  |
| 4,102,183 | A |   | 7/1978  | Thenander |  |
| 4,182,168 | A |   | 1/1980  | Desch |  |
| 4,326,424 | A |   | 4/1982  | Koenig |  |
| 4,451,730 | A |   | 5/1984  | Brogardh et al. |  |
| 4,467,661 | A |   | 8/1984  | Somal |  |
| 4,487,079 | A |   | 12/1984 | Compton et al. |  |
| 4,516,646 | A |   | 5/1985  | Bergfalk |  |
| 4,541,289 | A |   | 9/1985  | Valdemarsson |  |
| 4,802,368 | A |   | 2/1989  | Nordvall |  |
| 4,823,621 | A |   | 4/1989  | Sobel et al. |  |
| 4,825,709 | A |   | 5/1989  | Nordvall |  |
| 4,854,179 | A |   | 8/1989  | Häggström |  |
| 4,887,471 | A |   | 12/1989 | Kolavicic et al. |  |
| 4,899,599 | A |   | 2/1990  | Eddens |  |
| 4,958,525 | A |   | 9/1990  | Hauer et al. |  |
| 4,982,185 | A |   | 1/1991  | Holmberg et al. |  |
| 5,005,429 | A |   | 4/1991  | Haggstrom |  |
| 5,007,295 | A |   | 4/1991  | Gustafsson et al. |  |
| 5,014,799 | A |   | 5/1991  | Sato et al. |  |
| 5,045,827 | A |   | 9/1991  | Haggstrom |  |
| 5,122,742 | A |   | 6/1992  | Hoffman et al. |  |
| 5,128,676 | A |   | 7/1992  | Ordway |  |
| 5,159,841 | A |   | 11/1992 | Montalvo, III et al. |  |
| 5,186,061 | A |   | 2/1993  | Montalvo, III et al. |  |
| 5,257,550 | A |   | 11/1993 | Montalvo, III et al. |  |
| 5,315,882 | A | * | 5/1994  | Meyer et al. | 73/862.044 |
| 5,394,756 | A |   | 3/1995  | Gustafsson et al. |  |
| 5,419,210 | A |   | 5/1995  | Haker |  |
| 5,648,617 | A | * | 7/1997  | Cullen et al. | 73/862.04 |
| 6,002,090 | A | * | 12/1999 | Johnson et al. | 177/136 |

FOREIGN PATENT DOCUMENTS

| DE | 273549   | 9/1913  |
| GB | 1134592  | 11/1968 |
| JP | 04019592 | 1/1992  |

* cited by examiner

Primary Examiner—Benjamin R. Fuller
Assistant Examiner—Andre Allen
(74) Attorney, Agent, or Firm—Fish & Richardson P.C.

(57) ABSTRACT

A load cell comprises a member for receiving forces applied by the load, and a plurality of force sensing elements supported by the member and arranged with respect, to each other to independently sense differently directed components of the applied forces. The member is disposed, e.g., in a horizontal plane for receiving the load forces, and the force sensing elements are strain gages. One of the strain gages is arranged to sense a component of the forces applied in a vertical direction relative to the plane, and a second strain gage is arranged to sense a component of the forces applied in a horizontal direction relative to the plane. Among other advantages, the load cell is highly versatile can be used to measure loading forces applied in virtually any direction.

30 Claims, 7 Drawing Sheets

LOAD CELL

BACKGROUND

This invention relates to load cells, and more particularly to load cells having force sensing elements for measuring the applied forces.

One application of a load cell is to measure and monitor the strain forces (such as tension forces) on materials processed in the form of continuous webs or strands. Materials processed as webs include paper, plastic film, and metal foil; strands processed in this manner include wire, rope, and filaments. Measuring and controlling tension on the web or strand is an important factor in process quality, efficiency, and safety. For example, maintaining consistent tension promotes a more uniform web or strand product and avoids breakage and uneven stress in the product.

A typical load cell includes one or more force sensing elements, such as strain gages, which are configured as an electrical bridge circuit. The member deforms under the forces applied by the load (e.g., a roller of the aforementioned web or strand processing machine), thereby inducing changes in the resistance of one or more arms in the bridge and unbalancing the bridge. Electronic circuitry measures the extent of the imbalance, and determines therefrom the degree of deformation of the member. From this information, and from the load cell's materials and design, the amount of strain induced in the member—and hence the forces being applied by the load—is determined.

SUMMARY

This invention features a load cell that is capable of independently measuring differently directed components of forces applied by a load, and a method of measuring the force components with the load cell.

Among other advantages, the load cell is highly versatile can be used to measure loading forces applied in virtually any direction. Thus, the invention eliminates the need for load cells that are constructed differently to sense forces applied, e.g., in the vertical and horizontal directions. Moreover, there is no need to orient the load cell so that the force sensing elements are positioned with their direction of maximum sensitivity aligned with the direction of applied forces. Thus, the load cell is highly (but by no means exclusively) suited for use in web or strand processing machinery.

In one general aspect of the invention, the load cell comprising a member for receiving forces applied by the load, and a plurality of force sensing elements supported by the member and arranged with respect to each other to independently sense differently directed components of the forces.

Preferred embodiments may include one or more of the following features.

The force sensing elements are arranged to have substantially equal sensitivity to the differently directed components. The force sensing elements respectively sense orthogonally directed components of the forces. A first one of the force sensing elements is arranged to sense a component of the forces directed transversely to a plane of the member, and a second one of the force sensing elements is arranged to sense a component of the forces directed in the plane. The elements are supported by a portion of the member oriented in a first direction, and the second force sensing element is arranged to sense a component of the forces directed in the plane transversely (e.g., orthogonally) to the first direction.

Preferably, the force sensing elements are arranged in pairs, with a first force sensing element of each pair being arranged to sense a component of the forces applied in a first direction, and a second force sensing element of each pair being arranged to sense a component of the forces applied in a second, different direction. The force sensing elements are arranged so that the first force sensing element of each pair senses a component of the forces applied transversely—and preferably orthogonally—to a plane of the member, and the second element of each pair senses a component of the forces applied in the plane of the member.

Circuitry connected to the first force sensing element of each pair produces a first signal that indicates a magnitude of the component of the forces applied in the first direction. A second signal indicating a magnitude of the component of the forces applied in the second direction is produced by circuitry connected to the second element of each pair. In response to the first and second signals, circuitry produces an output signal that indicates a magnitude and direction of the forces applied by the load. The circuitry may also determine a force moment applied by the load.

The force sensing elements are preferably strain gages.

In another aspect of the invention, the load cell comprises a member disposed in a horizontal plane for receiving forces applied by a load, and a plurality of force sensing elements supported by the member, a first one of the force sensing elements being arranged to sense a component of the forces applied in a vertical direction relative to the plane, and a second one of the force sensing elements being arranged to sense a component of the forces applied in a horizontal direction relative to the plane.

Preferred embodiments may include one or more of the following features.

The plurality of elements includes a third force sensing element arranged to sense the component of the forces applied in the vertical direction, and a fourth force sensing element arranged to sense the component of the forces in the horizontal direction. Circuitry connected to the first element and the third element produces a first signal that indicates a magnitude of the component of the forces applied in the vertical direction, and circuitry connected to the second element and the fourth element produces a second signal that indicates a magnitude of the component of the forces applied in the horizontal direction. An output signal indicating a magnitude and direction of the forces applied by the load is produced by circuitry responsive to the first and second signals.

The member comprises a plurality of sections disposed in the horizontal plane for receiving the applied forces and an arm that interconnects the sections. The arm is oriented transversely to the component of the forces applied in the horizontal direction and supports the first and second force sensing elements; (e.g., strain gages). The member also includes a second arm interconnecting the sections. The second arm is oriented transversely to the component of the forces applied in the horizontal direction and supports the third and fourth force sensing elements (e.g., strain gages). The arms are disposed at opposite end regions of the sections. Preferably, the arms are parallel to each other, and the sections and the arms comprise a unitary body.

The load cell has a low profile and thus is particularly well-suited to installation under a so-called "pillow block" which supports bearings at the ends of rollers in web (or strand) processing machinery. The low profile allows the load cell to be retrofitted beneath the pillow blocks of existing roller assemblies without drastically altering the locations (e.g., the heights) of the rollers.

Other features and advantages of the invention will become apparent from the following description, and from the claims.

DRAWINGS

Figure 5:
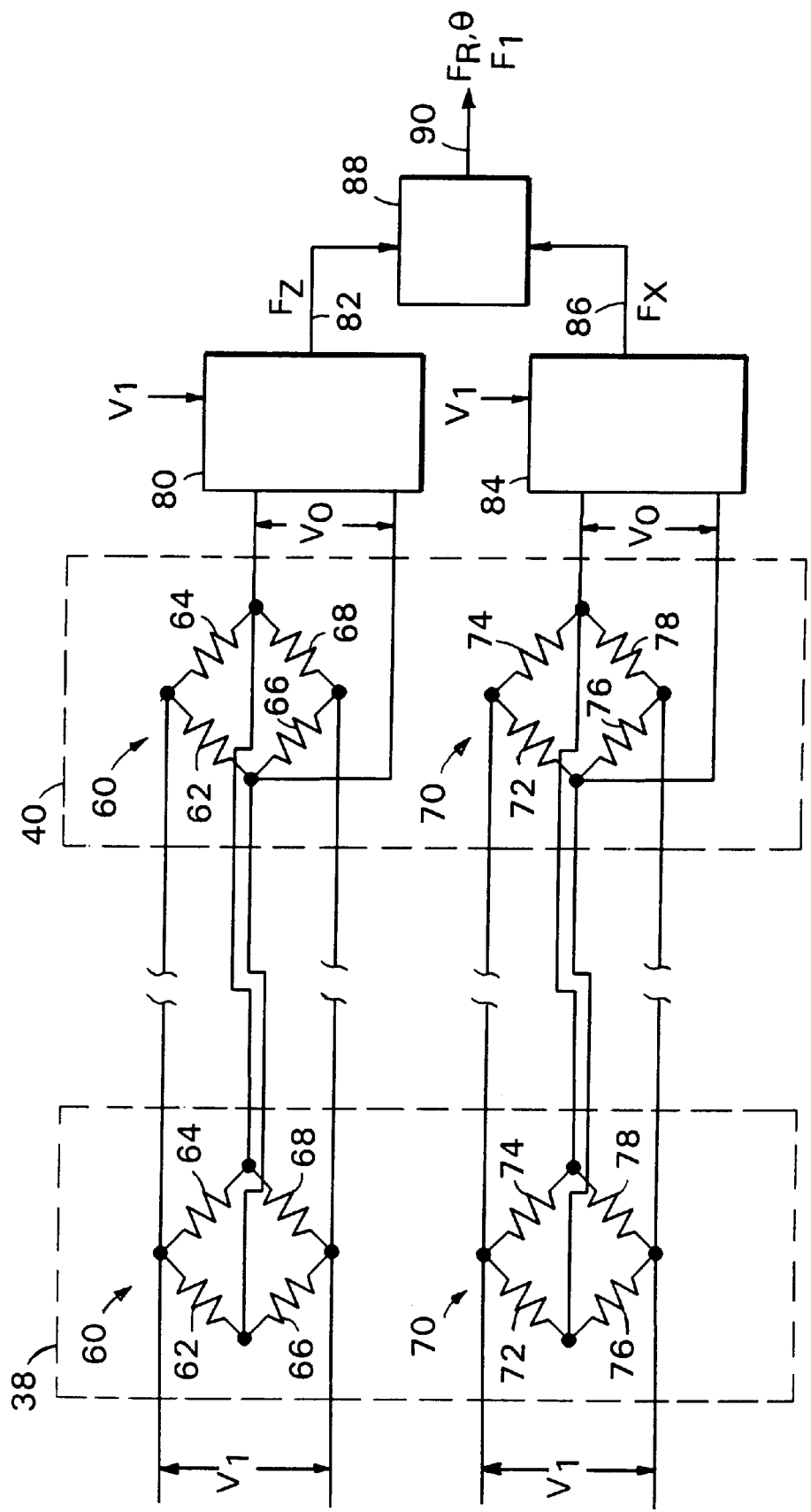

FIG. 5 schematically shows electrical connections between a plurality of force sensing elements of the load cell, and between the elements and external circuitry.

Figure 6:
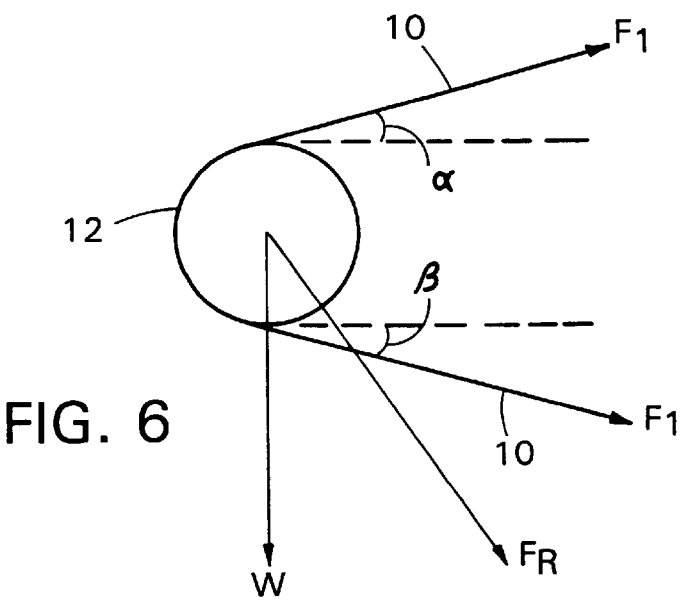

FIG. 6 is useful in understanding the operation of the load cell to determine tension forces in the web.

Figure 8:
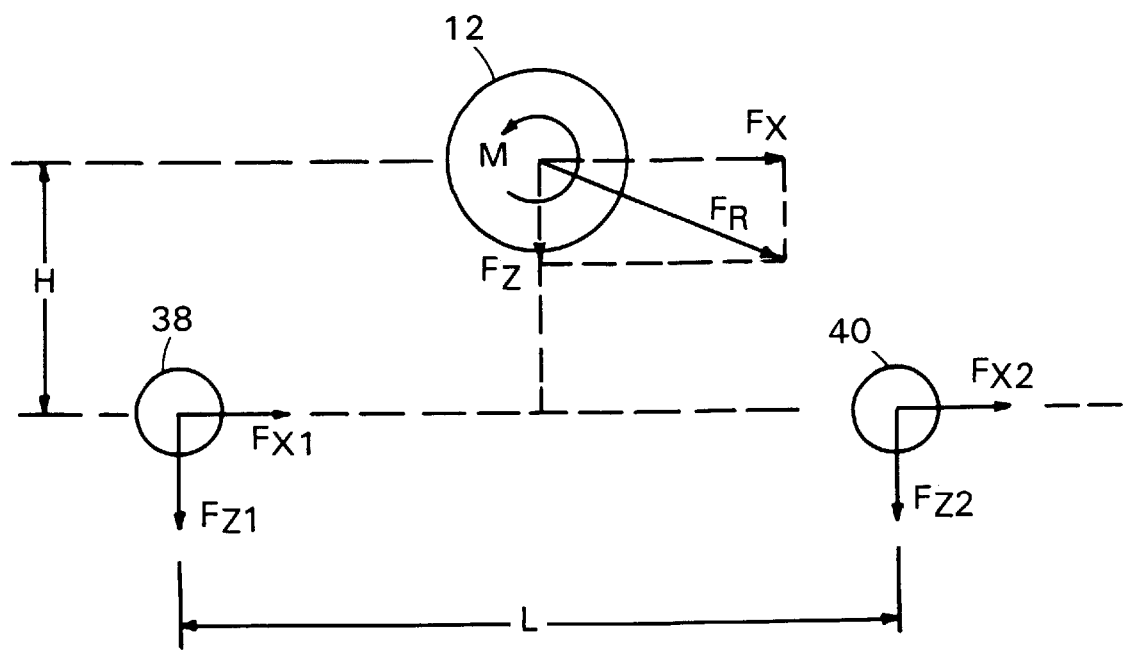
Figure 7:
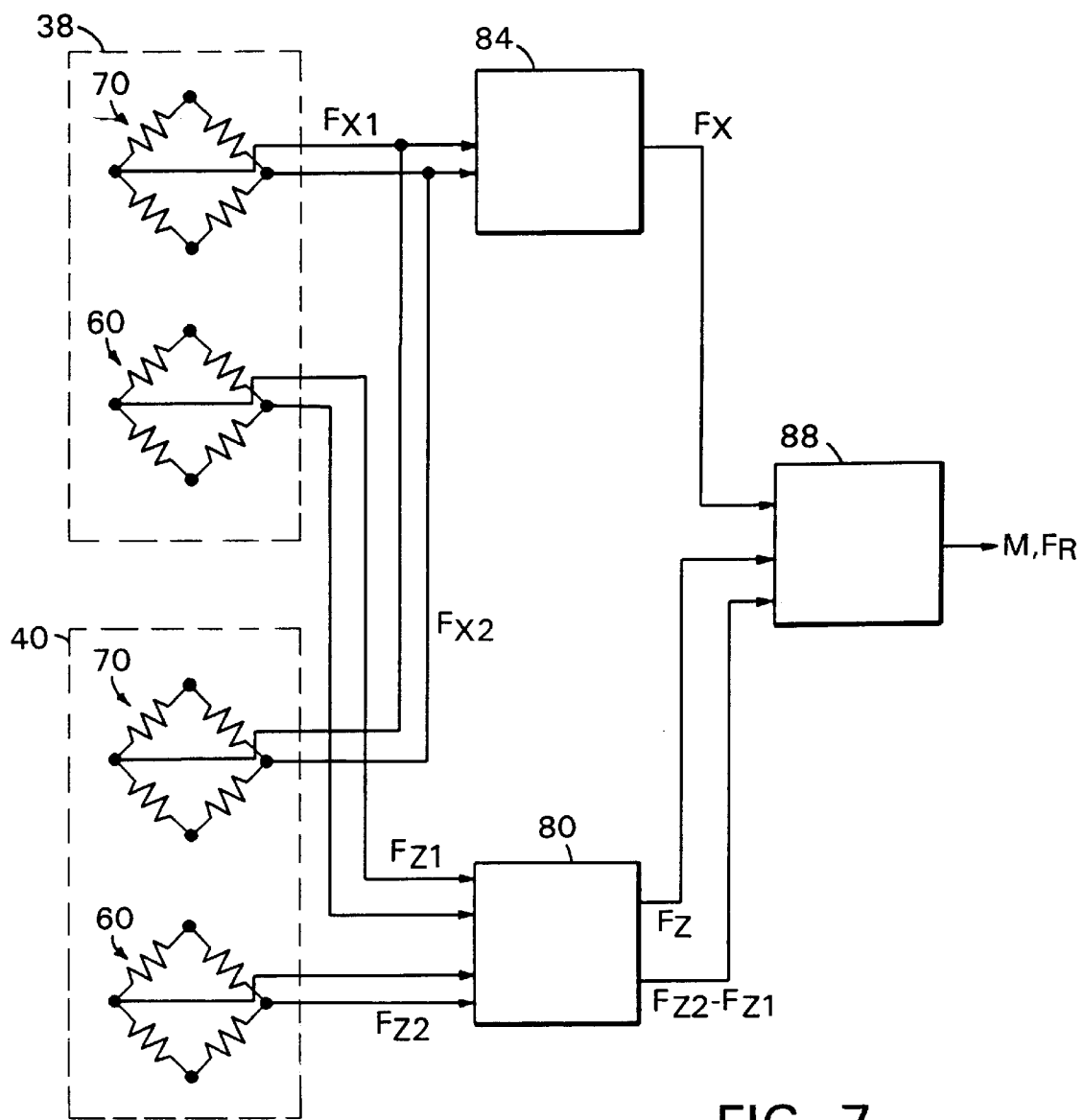

FIGS. 7 and 8 illustrate the use of the load cell to determine a force moment applied by the load.

DETAILED DESCRIPTION

Figure 1:
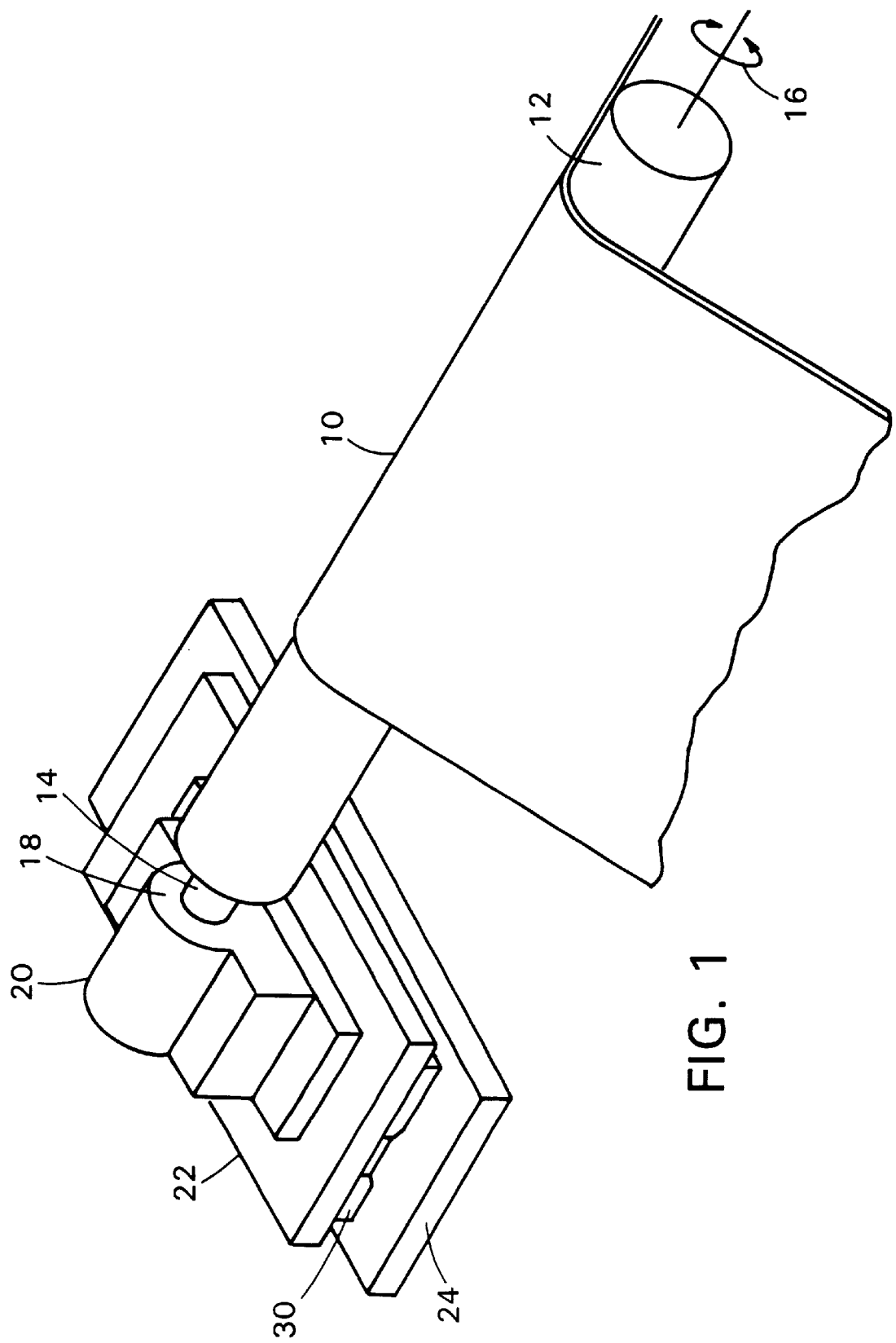
FIG. 1 shows a portion of a web processing machine in which a load cell is used to measure forces applied by the web of material.
Figure 2:
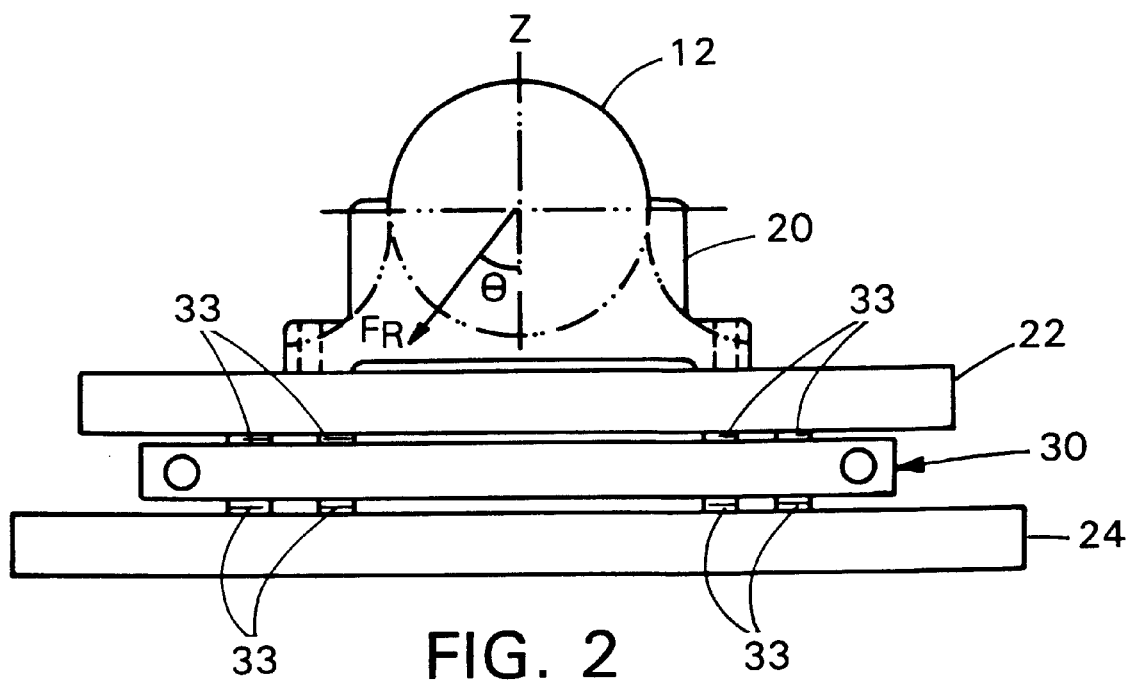
FIG. 2 illustrates the magnitude and direction of forces applied by the web.

Referring to FIGS. 1 and 2, a web 10 of material is transported between spools of web processing machinery by rollers 12, only one of which is shown (the remainder of the machine is not shown). Roller 12 is rotated by a shaft 14 in either direction 16 to transport web 10. Each end of shaft 14 is supported by a bearing 18 nested within a socalled "pillow block" 20. The forces applied by web 10, illustrated as vector $F_R$ directed at angle θ with respect to the vertical (z) axis, are measured by load cell 30, which is positioned between an upper bearing plate 22 and a lower bearing plate 24 beneath pillow block 20.

Figure 3:
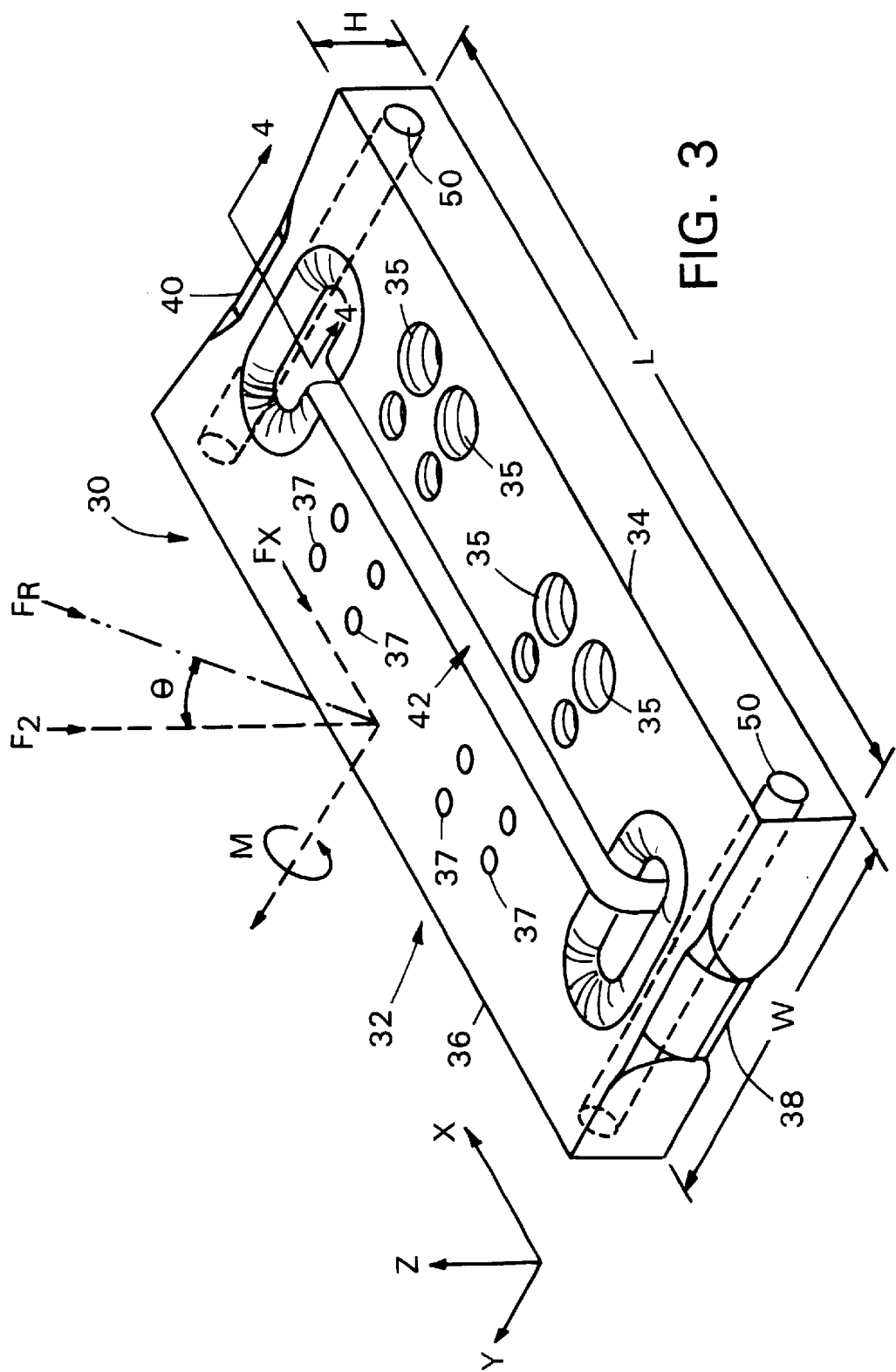
FIG. 3 shows a load cell that includes force sensing elements arranged with respect to each other to respectively sense differently directed components of the applied forces.
Figure 3A:
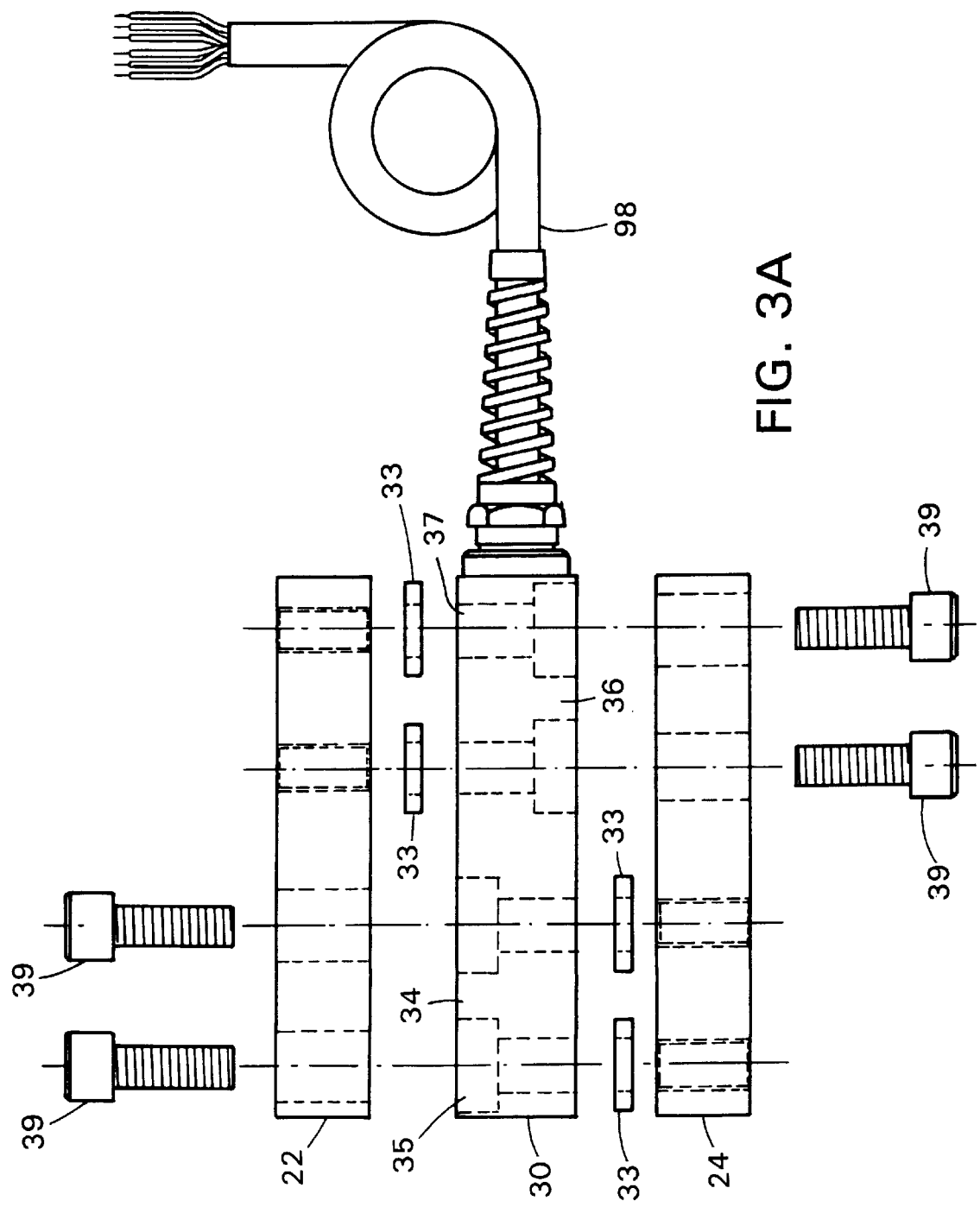
FIG. 3A is an exploded, end view of the load cell, which illustrates the connection between the load cell and upper and lower adapter plates.

Referring also to FIGS. 3 and 3A, load cell 30 comprises a planar, rectangular member 32 which receives the forces applied by web 10 (i.e., the load) and supports a plurality of force sensing elements (in this embodiment, strain gages) arranged to sense differently directed components of the forces. As will be described in detail below, the force sensing elements sense the components of force $F_R$ applied along the z-axis ($F_z$) and along the x-axis ($F_x$) (the coordinate system of load cell 30 is shown to the left of the load cell in FIG. 3). Circuitry (shown in FIG. 5 and discussed below) responds to electrical signals produced by the force sensing elements in response to force components $F_z$ and $F_x$ to determine the magnitude and direction (θ) of the overall force $F_R$ applied by web 10 and/or the tension in the web.

Load cell member 32 includes a pair of elongated sections 34, 36 that extend along the x-axis and lie in the x-y plane. The opposite end regions of sections 34, 36 are interconnected by tubular arms 38, 40 which extend in parallel along the y-axis, orthogonally to sections 34, 36. Between their end regions, sections 34, 36 are spaced from each other by a slot 42. Sections 34, 36 and arms 38, 40 are cast or machined from a single, unitary body of stainless steel to eliminate undesirable stresses that might otherwise arise from misalignments and tolerance build-up. Load cell 30 is positioned beneath pillow block 20 so that roller shaft 14 (which extends along the y-axis) is positioned mid-way between arms 38, 40.

As best shown in FIG. 3A, member 32 is sandwiched between upper and lower bearing plates 22, 24 and spaced therefrom by sixteen washers 33 (eight washers for each section 34, 36). Section 34 is connected to lower bearing plate 24 by bolts 39. The heads of bolts 39 pass though holes in upper bearing plate 22 and are received in counterbored holes 35 in section 34. The threaded shafts of bolts 39 pass through washers 33 and are received by threaded holes in lower bearing plate 24. Likewise, section 36 is connected to upper bearing plate 22 by bolts 39. The threaded shafts of bolts 39 are received by threaded holes in upper bearing plate 22 via washers 33. The heads of bolts 39 pass through holes in lower bearing plate 24 and are received in counterbored holes 37 on the underside of section 36 through holes 37.

Washers 33 concentrate the loading forces applied via adapter plates 22, 24 and ensure that each adapter plate 22, 24 contacts only one of the sections (i.e., that adapter plate 22 contacts only section 36, and not section 34, and that adapter plate 24 contacts only section 34 and not section 36). This arrangement (along with the presence of slot 42 between sections 34, 36) ensures that the loading forces applied to sections 34, 36 induce shear forces in arms 38, 40.

Member 32 has a low profile, e.g., with a height dimension H of approximately 1¼ inches. Thus, even taking into account the thickness of washers 33 (e.g., ⅛ inch), the total space between adapter plates 22, 24 needed to accommodate load cell 30 is only about 1½ inches. The length L and width W dimensions of member 32 are selected (e.g., 12–14 inches and 6 inches, respectively) to approximate the footprint of a standard-sized pillow block. As a result, member 32 can easily be retrofit beneath pillow block 20 without significantly altering the location (e.g., the height) of roller 12 (FIG. 1).

Figure 4:
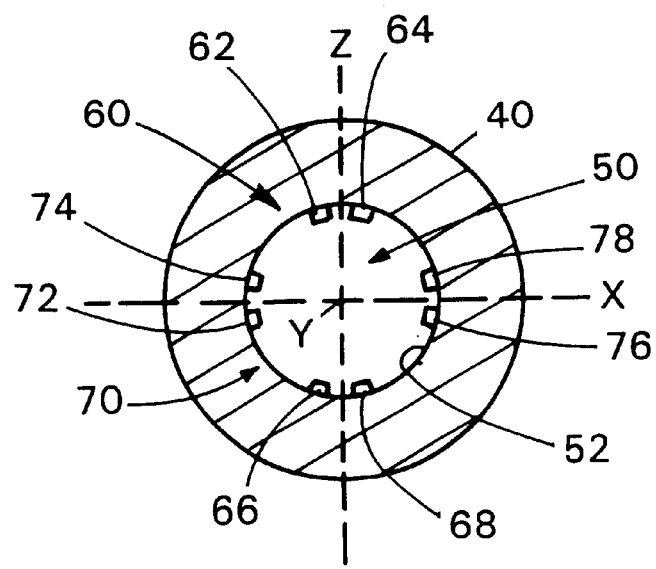
FIG. 4 is a cross-sectional view of an arm of the load cell taken along lines 4—4 of FIG. 3.

Referring also to FIG. 4, a passage 50 extends axially through each arm 38, 40 so that each arm is tubular. Each passage 50 is circular in cross-section and is centered about y-axis to define an annular interior surface 52 which is subjected to strain in response to the forces $F_R$ applied by the load.

At the mid-point of each arm 38, 40 (i.e., equidistantly between sections 34, 36), a pair of strain gages 60, 70 are attached to surface 52 and positioned so that their direction of maximum sensitivity is aligned with the z-axis and the x-axis, respectively. That is, strain gages 60, 70 independently sense the strain induced in surface 52 by components $F_z$ and $F_x$, respectively, of force $F_R$. Accordingly, arms 38, 40 support two pairs of strain gages, with one strain gage 60 of each pair being arranged to sense a force component directed along the z-axis, and the other strain gage 70 in each pair being arranged to independently sense a force component directed along the x-axis. The tubular nature of arms 38, 40 facilitates sealing passages 50 (the seals are not shown) to protect strain gages 60, 70 from adverse ambient conditions (e.g., moisture and corrosives).

Referring also to FIG. 5, each strain gage 60 includes four strain sensitive resistors 62, 64, 66, 68 arranged in a bridge. Resistors 62, 64 are attached to an upper region of surface 52 and symmetrically arranged about the z-axis. Resistors 66, 68 are attached to a lower region of surface 52, directly opposite to resistors 62, 64, and are also symmetrically positioned about the z-axis. Each strain gage 70 includes four strain sensitive resistors 72, 74, 76, 78 arranged in a bridge. Resistors 72, 74 are attached to a left side region (as shown in FIG. 4) of surface 52 and are symmetrically arranged about the x-axis. Resistors 76, 78 are attached to a right side region of surface 52, directly opposite to resistors 72, 74, and are also symmetrically positioned about the x-axis. The circular shape of surface 52 and the symmetrical positioning of the strain sensitive resistors enables strain gages 60, 70 to have substantially equal sensitivity to respective force components $F_z$ and $F_x$.

Strain gages 60 are electrically connected together as shown in FIG. 5 to receive a reference input voltage $V_i$ and generate an output voltage $V_o$. Likewise, strain gages 70 are electrically connected together as shown in FIG. 5 to receive a reference input voltage $V_i$ and generate an output voltage $V_o$. Output voltage $V_o$ of strain gages 60, 70 respectively represent the strain induced in surfaces 52 of arms 38, 40 in by force components $F_z$ and $F_x$. The processing of output voltages $V_o$ is described in more detail below, but briefly, output voltages $V_o$ are processed by circuits 80, 84 external to member 32 to produce signals 82, 86 that respectively represent force component $F_z$ and force component $F_x$. Signals 82, 86 are applied to external circuitry 88, which responds by producing an output signal 90 representative of the magnitude and the direction (angle θ) of force $F_R$. The connections between strain gages 60, 70 and the external circuits are provided by cables (such as cable 90, FIG. 3A) connected to fittings at one end of each passage 50.

In operation, the loading forces from web 10 are applied to sections 34, 36 in the x-z plane, transverse to arms 38, 40. As a result, the mid-point of arms 38, 40—where strain gages 60, 70 are located—experience only shear forces. Due to the circular symmetry of surfaces 52 and the positioning of resistors 62–68 and 72–78, strain gages 60, 70 are equally sensitive to force components $F_z$ and $F_x$, respectively. Accordingly, the output voltages produced by strain gages 60, 70 accurately represent the strain induced in surfaces 52 in response to these force components.

The output voltage $V_o$ of a strain gage 60, 70 is defined as $$V_o = V_i(GF)(S) \tag{1}$$

where GF (gage factor) is related to the material of the strain gage (e.g., for foil-type strain gages such as strain gages 60, 70, GF≈2; semiconductor strain gages have higher gage factors, such as 100 or more) and S is the strain ($\Delta L/L$) in the direction of measurement (i.e., along the z or x axis). Because the strain gages 60, 70 of arms 38, 40 are connected together as shown in FIG. 5, the output voltage of each set of strain gages 60, 70 will be proportional to the average of the strain ($S_1$) sensed by the gages 60, 70 in arm 38 and the strain ($S_2$) sensed by the gages 60, 70 in arm 40:

$$V_o = V_i(GF)(\text{average } S_1, S_2) \tag{2}$$

Of course, the average of the sensed strain is a measure of the sum of $S_1$ and $S_2$, divided by the number of sensors (in this case, two).

Circuits 80, 84 apply equation (2) to the respective output voltages $V_o$ of strain gages 60, 70 to determine $F_z$ and $F_x$ in a known manner. Force components $F_z$ and $F_x$ are related to overall force $F_R$ and angle θ as follows:

$$F_x = F_R(\cos θ) \tag{3}$$

$$F_z = F_R(\sin θ) \tag{4}$$

Accordingly, circuitry 88 determines the magnitude of force $F_R$ as:

$$F_R = \sqrt{(F_x^2 + F_z^2)} \tag{5}$$

and the direction of force $F_R$ as:

$$θ = \arctan(F_z/F_x) \tag{6}$$

Referring to FIG. 6, force $F_R$ represents the total forces applied to load cell 30 by web 10, including the weight (W) of web 10, roller 12, and pillow block 20 and the tension ($F_1$) in web 10. Although tension forces $F_1$ can be derived from $F_R$, it often desirable determine the web tension forces/directly from components $F_z$ and $F_x$. This determination is straightforward, and can be made by circuitry 88 using either signal 82 ($F_z$) or signal 86 ($F_x$):

$$F_z = W + F_1(\sin β) - F_1(\sin α) \tag{7}$$

$$F_x = F_1(\cos α) + F_1(\cos β) = F_1(\cos α + \cos β) \tag{8}$$

where α and β are the angles between web 10 and the horizontal plane in the system. That is, the output signal 90 produced by circuitry 88 may represent tension force $F_1$ in web 10, rather than (or in addition to) overall force $F_R$ and angle θ.

Referring to FIGS. 7 and 8, strain gages 60, 70 and circuitry 80, 84, 88 may also be connected to enable the circuitry to determine force moment M about the y-axis of roller 12. FIG. 8 illustrates the relationship between force components $F_z$ and $F_x$, the spacing L between arms 38, 40, and the height H of roller 12 with respect to the plane of the load cell. Force component $F_x$ is the sum of the individual X-axis force components ($F_{x1}$ and $F_{x2}$) measured by strain gages 70, and force component $F_z$ is the sum the individual Z-axis force components ($F_{z1}$ and $F_{z2}$) measured by strain gages 60. That is:

$$F_x = F_{x1} + F_{x2} \tag{9}$$

$$F_z = F_{z1} + F_{z2} \tag{10}$$

Accordingly:

$$L/2(F_{z2} - F_{z1}) = HF_x + M \tag{11}$$

or $$L/2(F_{z2} - F_{z1}) = H(F_{x1} + F_{x2}) + M \tag{12}$$

Solving equation 12 for force moment M results in the following relationship:

$$M = L/2(F_{z2} - F_{z1}) - H(F_{x1} + F_{x2}) \tag{13}$$

Because spacing L and height H are known, circuitry 80, 84, 88 calculates moment M based on the individual outputs of strain gages 60, 70.

FIG. 7 shows the appropriate connections between the outputs of strain gages 60, 70 and circuits 80, 84 which enable the measurement of individual vertical force components $F_{z1}$ and $F_{z2}$ to be made. (The reference voltages applied to the strain gages are not illustrated.) If desired, the outputs of strain gages 70 can be individually connected to circuit 84, rather than ganged together as shown in FIG. 7.

Moreover, circuitry 80, 84, 88 may calculate the torque on roller 12 by determining the difference between the vertical force component $F_{z1}$ measured by strain gage 60 in arm 38 and vertical force component $F_{z2}$ strain gage 60 in arm 40.

Because load cell 30 independently measures differently directed components of the overall force applied by the load, load cell 30 is highly versatile and can be used at locations throughout the processing machinery. For example, identical load cells 30 can be used to measure web tension at several rollers 12 in the machinery, regardless of the orientations and angles of the rollers. That is, load cell 30 is equally suited for use in situations in which either $F_z$ or $F_x$ is zero. Although one set of strain gages 60, 70 would be inoperative, the output signal derived from the other strain gages can be used to determine forces such as web tension. Thus, there is no need to use separate horizontally sensitive and vertically sensitive load cells in such situation, or to orient the strain gages in a load cell so that their direction of maximum sensitivity is aligned with the direction of the applied force.

Other embodiments are within the scope of the following claims.

For example, other types of strain gages (such as semiconductor strain gages) may be used. Other kinds of force sensing elements (such as capacitive, inductive, and optical force sensing elements) can be used in place of strain gages. Load cell 30 can be used in other applications, such as with other types of continuously processed materials (such as strands) and other kinds of processing machinery. Examples include manufacturing machinery for textiles, asphalt roof shingles, wall board, sheet rock, and conveyor belts.

Materials other than stainless steel may be used for load cell member 30. For example, member 30 can be made from spring steel, alloy steel, beryllium copper, aluminum, or other suitable materials which provide an acceptable relationship between applied force and displacement. Sections 34, 36 and arms 38, 40 may be assembled from individual components, rather than formed as a unitary body. Only a single arm 38, 40 and a single set of strain gages 60, 70 may be used, if desired.

Load cell 30 need not be centered under the pillow block, with the load positioned equidistantly between arms 38, 40. Indeed, because the outputs of the strain gages of the two arms are averaged as described above, load cell 30 is insensitive to such variations in load position.

What is claimed is:

1. A load cell comprising:
    a member disposed in a plane for receiving forces applied by a load, said member comprising a plurality of sections disposed in the plane and having an axial dimension, and an arm extending transversely to the axial dimension between the sections, said arm comprising a surface oriented in a first direction in the plane, said sections and said arm being arranged so that the forces applied by the load to a first one of said sections are transmitted by the arm to a second one of said sections,
    a plurality of force sensing elements disposed on the surface and arranged with respect to each other to independently sense differently directed components of the forces transmitted by said arm; and
    a first one of the force sensing elements being arranged to sense a component of the forces directed transverse to the plane and a second one of the force sensing elements being arranged to sense a component of the forces directed in the plane.

2. The load cell of claim 1 wherein said force sensing elements are arranged to have substantially equal sensitivity to the differently directed components.

3. The load cell of claim 1 wherein the component of the forces directed in the plane is along the axial dimension.

4. The load cell of claim 1 wherein the plurality of force sensing elements are arranged in pairs, a first force sensing element of each pair being arranged to sense the component of the forces applied transverse to the plane, and a second force sensing element of each pair being arranged to sense a component of the forces applied in the plane.

5. The load cell of claim 4 further comprising:
    circuitry connected to the first force sensing element of each pair for producing a first signal that indicates a magnitude of the component of the forces applied transverse to the plane, and
    circuitry connected to the second force sensing element of each pair for producing a second signal that indicates a magnitude of the component of the forces applied in the plane.

6. The load cell of claim 5 further comprising circuitry responsive to the first signal and the second signal for producing an output signal that indicates a magnitude and direction of the forces applied by the load.

7. The load cell of claim 6 wherein the force sensing elements are arranged so that the first force sensing element of each pair senses a component of the forces applied orthogonally to a plane of the member, and the second force sensing element of each pair senses a component of the forces applied in the plane of the member.

8. The load cell of claim 5 further comprising circuitry responsive to the first signal and the second signal for producing an output signal that indicates a force moment applied by the load.

9. The load cell of claim 1 wherein the force sensing elements are strain gages.

10. A load cell comprising:
    a member disposed in a horizontal plane for receiving forces applied by a load, said member comprising a plurality of generally planar sections disposed in the horizontal plane and having an axial dimension, and an arm extending transversely to the axial dimension between the sections, said arm comprising a surface oriented in a first direction in the horizontal plane, said sections and said arm being arranged so that the forces applied by the load to a first one of said sections are transmitted by the arm to a second one of said sections, and
    a plurality of force sensing elements disposed on the surface for sensing the forces transmitted by said arm, a first one of the force sensing elements being arranged to sense a component of the forces applied in a vertical direction relative to the plane, and a second one of the force sensing elements being arranged to sense a component of the forces applied in a horizontal direction relative to the plane.

11. The load cell of claim 10 wherein the plurality of force sensing elements includes a third force sensing element arranged to sense the component of the forces applied in the vertical direction, and a fourth force sensing element arranged to sense the component of the forces in the horizontal direction.

12. The load cell of claim 11 further comprising
    circuitry connected to the first force sensing element and the third force sensing element for producing a first signal that indicates a magnitude of the component of the forces applied in the vertical direction, and
    circuitry connected to the second force sensing element and the fourth force sensing element for producing a second signal that indicates a magnitude of the component of the forces applied in the horizontal direction.

13. The load cell of claim 12 further comprising circuitry responsive to the first signal and the second signal for producing an output signal that indicates a magnitude and direction of the forces applied by the load.

14. The load cell of claim 10 wherein the arm interconnects the sections and is oriented transversely to the component of the forces applied in the horizontal direction.

15. The load cell of claim 10 wherein the plurality of force sensing elements includes a third force sensing element arranged to sense the component of the forces applied in the vertical direction, and a fourth force sensing element arranged to sense the component of the forces in the horizontal direction, and the member further comprises a second arm extending transversely to the axial dimension and interconnecting the sections, the second arm being oriented transversely to the component of the forces applied in the horizontal direction and supporting the third and fourth force sensing elements.

16. The load cell of claim 15 wherein the arms are disposed at opposite end regions of the sections.

17. The load cell of claim 15 wherein the arms are oriented parallel to each other.

18. The load cell of claim 15 wherein the sections and the arms comprise a unitary body.

19. The load cell of claim 10 wherein the force sensing elements are arranged to sense the vertical and horizontal components independently of each other.

20. The load cell of claim 10 wherein the first and second force sensing elements are arranged to have substantially equal sensitivity to the vertical and horizontal components, respectively.

21. The load cell of claim 10 wherein the force sensing elements are strain gages.

22. A method of measuring forces applied by a load, comprising:

providing a load cell comprising a member disposed in a plane for receiving forces applied by a load, said member comprising a plurality of sections disposed in the plane and having an axial dimension, and an arm extending transversely to the axial dimension between the sections, said arm comprising a surface oriented in a first direction in the plane, said sections and said arm being arranged so that the forces applied by the load to a first one of said sections are transmitted by the arm to a second one of said sections, and a plurality of force sensing elements disposed on the surface;

receiving the applied forces by the member of the load cell;

independently sensing differently directed components of the applied forces transmitted by said arm with the force sensing elements; and sensing a component of the forces directed transverse to the plane with a first one of the force sensing elements and sensing a component of the forces directed in the plane with a second one of the force sensing elements.

23. The method of claim 22 further comprising sensing the differently directed components with substantially equal sensitivity with the force sensing elements.

24. The method of claim 22 further comprising arranging the plurality of force sensing elements in pairs, sensing a component of the forces applied in a first direction with a first force sensing element of each pair, and sensing a component of the forces applied in a second, different direction with a second force sensing element of each pair.

25. The method of claim 24 further comprising producing a first signal that indicates a magnitude of the component of the forces applied in the first direction in response to the first force sensing element of each pair, and producing a second signal that indicates a magnitude of the component of the forces applied in the second direction in response to the second force sensing element of each pair.

26. The method of claim 25 further comprising producing an output signal that indicates a magnitude and direction of the forces applied by the load in response to the first signal and the second signal.

27. The method of claim 26 further comprising arranging the force sensing elements so that the first force sensing element of each pair senses a component of the forces applied transversely to a plane of the member, and the second force sensing element of each pair senses a component of the forces applied in the plane of the member.

28. The method of claim 26 further comprising arranging the force sensing elements so that the first force sensing element of each pair senses a component of the forces applied orthogonally to a plane of the member, and the second force sensing element of each pair senses a component of the forces applied in the plane of the member.

29. The method of claim 25 further comprising producing an output signal that indicates a force moment applied by the load in response to the first signal and the second signal.

30. The method of claim 22 wherein the force sensing elements are strain gages.

* * * * *